United States Patent
Fukushima et al.

(10) Patent No.: US 12,166,419 B2
(45) Date of Patent: Dec. 10, 2024

(54) CONTROL CIRCUIT OF BOOST DC-DC CONVERTER, POWER SUPPLY CIRCUIT, AND ELECTRONIC DEVICE

(71) Applicant: ROHM Co., LTD., Kyoto (JP)

(72) Inventors: Shun Fukushima, Kyoto (JP); Tomohisa Shinozaki, Kyoto (JP); Tsutomu Ishino, Kyoto (JP)

(73) Assignee: ROHM Co., Ltd., Kyoto (JP)

( * ) Notice: Subject to any disclaimer, the term of this patent is extended or adjusted under 35 U.S.C. 154(b) by 209 days.

(21) Appl. No.: 17/806,521

(22) Filed: Jun. 13, 2022

(65) Prior Publication Data

US 2022/0407419 A1    Dec. 22, 2022

(30) Foreign Application Priority Data

Jun. 16, 2021 (JP) .................. 2021-100348

(51) Int. Cl.
*H02M 3/158* (2006.01)
*H02M 1/00* (2006.01)
(Continued)

(52) U.S. Cl.
CPC ......... *H02M 3/158* (2013.01); *H02M 1/0009* (2021.05); *H02M 1/08* (2013.01); *H02M 1/32* (2013.01); *H02M 3/157* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10;
(Continued)

(56) References Cited

U.S. PATENT DOCUMENTS 9,350,180 B2 *  5/2016  Maxwell ............... H02J 7/0036
9,755,511 B2 *  9/2017  Lee ......................... H02M 1/08
(Continued)

FOREIGN PATENT DOCUMENTS

JP    2021019500    2/2021

*Primary Examiner* — Jeffrey A Gblende
(74) *Attorney, Agent, or Firm* — CHIP LAW GROUP

(57) ABSTRACT

Disclosed is a control circuit of a boost DC-DC converter including a high side transistor and a low side transistor, and a load switch connected between the high side transistor and an output line of the boost DC-DC converter. The control circuit includes a pulse modulator that generates a pulse signal with a pulse modulated to bring an output voltage of the output line close to a target level, a logic circuit that generates a high side control signal and a low side control signal based on the pulse signal, a load switch drive circuit that drives a first PMOS transistor provided as the load switch, and a current detection circuit that generates a current detection signal indicating a current flowing through the first PMOS transistor. The load switch drive circuit is switchable between a first mode and a second mode.

19 Claims, 12 Drawing Sheets

(51) Int. Cl.
*H02M 1/08* (2006.01)
*H02M 1/32* (2007.01)
*H02M 3/157* (2006.01)

(58) Field of Classification Search
CPC ........ H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 10,397,992 B2 * | 8/2019 | Cohen | G01R 19/003 |
| 10,892,637 B2 * | 1/2021 | Lu | H02M 3/158 |

* cited by examiner

CONTROL CIRCUIT OF BOOST DC-DC CONVERTER, POWER SUPPLY CIRCUIT, AND ELECTRONIC DEVICE

CROSS REFERENCE TO RELATED APPLICATIONS

This application claims priority benefit of Japanese Patent Application No. JP 2021-100348 filed in the Japan Patent Office on Jun. 16, 2021. Each of the above-referenced applications is hereby incorporated herein by reference in its entirety.

BACKGROUND

The present disclosure relates to a boost direct-current (DC)-DC converter.

A boost DC-DC converter (boost converter) is used to operate a device that requires a voltage higher than a power supply voltage. An input line and an output line of the boost DC-DC converter are electrically connected all the time through an inductor and a body diode of a high side transistor. Therefore, even when the boost DC-DC converter is stopped, a voltage equal to an input voltage is generated in the output line, and the voltage is supplied to a load.

To prevent the supply of voltage to the load when the boost DC-DC converter is stopped, a load switch is inserted between the high side transistor and the output line. Alternatively, instead of the load switch, a high side switch is inserted between the input line and the inductor in some cases. The load switch or the high side switch can be turned off to prevent generation of voltage in the output line when the boost DC-DC converter is stopped.

When the input voltage is lower than a target level of an output voltage, the load switch is fully turned on to minimize the loss, and the output voltage of the boost DC-DC converter is stabilized at the target level by feedback control (pulse width modulation) of the boost converter.

An example of the related art is disclosed in Japanese Patent Laid-open No. 2020-120473.

As a result of examination of the boost DC-DC converter including the load switch, the present inventors have recognized the following problem. Note that the problem should not be construed as general perception of those skilled in the art.

Assuming that the activation of the boost DC-DC converter is started when the input voltage is higher than the target level of the output voltage, if the boost DC-DC converter is operated while the load switch is fully turned on, the output voltage may significantly leap up due to the influence of an induced voltage of the inductor.

The present disclosure has been made in view of the problem, and one of exemplary objects of the present disclosure is to provide a control circuit that can suppress leap-up of an output voltage.

SUMMARY

An example of the present disclosure relates to a control circuit of a boost DC-DC converter. The boost DC-DC converter includes a high side transistor and a low side transistor, and a load switch connected between the high side transistor and an output line of the boost DC-DC converter. The control circuit includes a pulse modulator that generates a pulse signal with a pulse modulated to bring an output voltage of the output line close to a target level, a logic circuit that generates a high side control signal and a low side control signal based on the pulse signal, a load switch drive circuit that drives a first PMOS transistor provided as the load switch, and a current detection circuit that generates a current detection signal indicating a current flowing through the first PMOS transistor. The load switch drive circuit is switchable between a first mode for fully turning on the first PMOS transistor and a second mode for changing a gate voltage of the first PMOS transistor according to the current detection signal so that a current supply capacity of the first PMOS transistor becomes larger than an amount of current indicated by the current detection signal.

Another example of the present disclosure also provides a control circuit of a boost DC-DC converter. The control circuit includes a pulse modulator that generates a pulse signal with a pulse modulated to bring an output voltage of an output line close to a target level, a logic circuit that generates a high side control signal and a low side control signal based on the pulse signal, a load switch drive circuit that drives a first PMOS transistor provided as a load switch, and a current detection circuit that generates a current detection signal indicating a current flowing through the first PMOS transistor. The load switch drive circuit includes a second PMOS transistor with a size of 1/M times a size of the first PMOS transistor, a gate of the second PMOS transistor connectable to a gate of the first PMOS transistor, a source of the second PMOS transistor connected to a source of the first PMOS transistor, the gate and a drain of the second PMOS transistor connected through a wire, and a constant current circuit that supplies the second PMOS transistor with a current of equal to or greater than K/M times an amount of current indicated by the current detection signal.

Note that any combinations of the constituent elements as well as constituent elements and expressions obtained by exchanging the constituent elements and the expressions among methods, apparatuses, and systems are also effective as aspects of the present disclosure.

According to the aspects of the present disclosure, the leap-up of the output voltage can be suppressed.

DETAILED DESCRIPTION OF THE PREFERRED EMBODIMENTS

Overview of Embodiments

Figure 1:
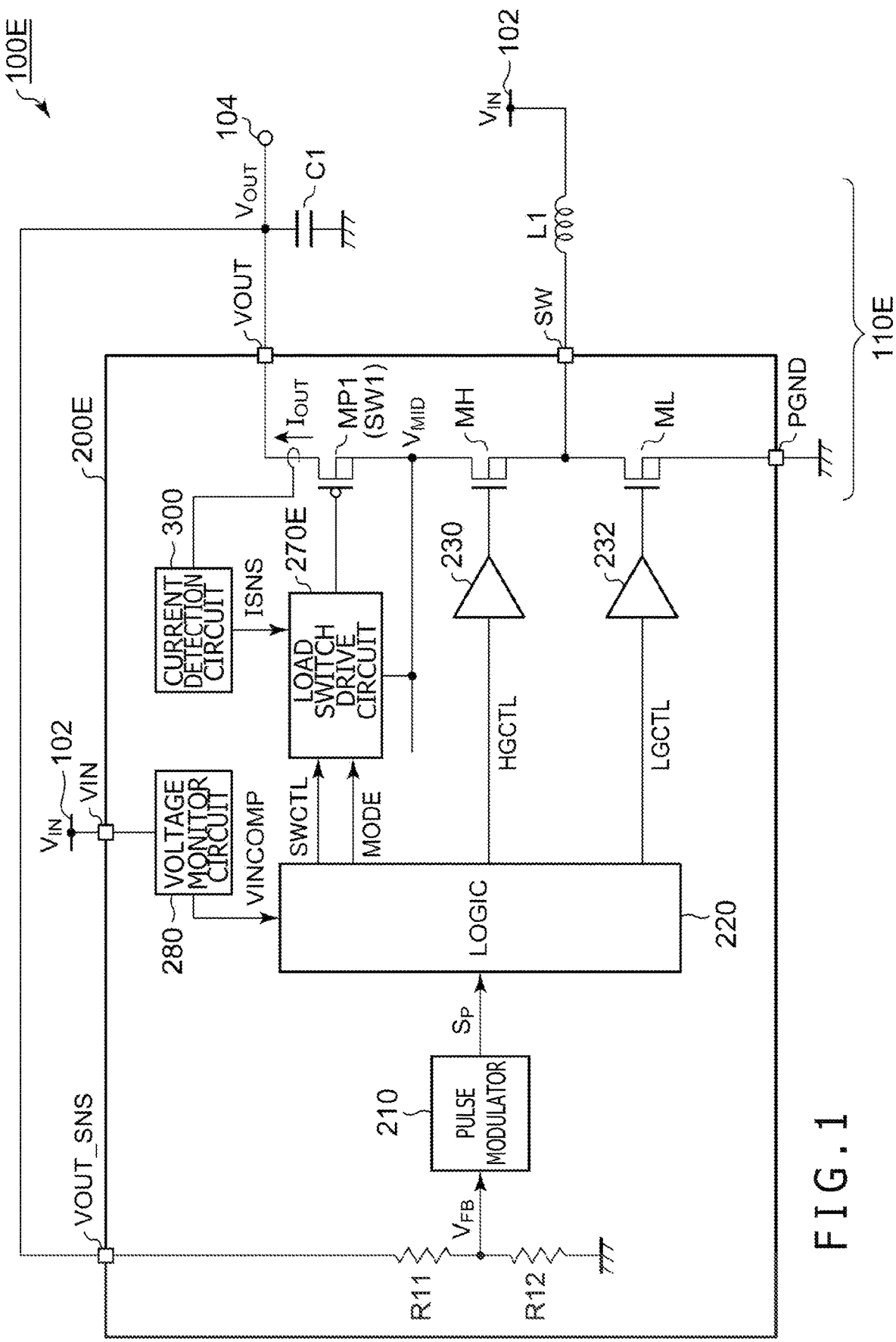
FIG. 1 is a circuit diagram of a boost DC-DC converter according to a first embodiment.

An overview of some exemplary embodiments of the present disclosure will be described. The overview simply describes some concepts of one or a plurality of embodiments for basic understanding of the embodiments as a preface to detailed explanation described later, and the overview does not limit the extent of the disclosure or the disclosure. The overview is not a comprehensive overview of all conceivable embodiments, and the overview is not intended to specify important elements of all the embodiments or to define the scope of part or all of the aspects. For convenience, "one embodiment" may be used to indicate one embodiment (an example or a modification) or a plurality of embodiments (examples or modifications) disclosed in the present specification.

An embodiment provides a control circuit of a boost DC-DC converter, the control circuit including a pulse modulator that generates a pulse signal with a pulse modulated to bring an output voltage of an output line close to a target level, a logic circuit that generates a high side control signal and a low side control signal based on the pulse signal, a load switch drive circuit that drives a first p-channel metal-oxide semiconductor (PMOS) transistor provided as a load switch, and a current detection circuit that generates a current detection signal indicating a current flowing through the first PMOS transistor. The load switch drive circuit can make a switch between (i) a first mode for fully turning on the first PMOS transistor and (ii) a second mode for changing a gate voltage of the first PMOS transistor according to the current detection signal such that a current supply capacity of the first PMOS transistor becomes larger than an amount of current indicated by the current detection signal.

According to the configuration, the second mode can be selected to suppress the leap-up of the output voltage in a situation where the input voltage is higher than the target level of the output voltage.

In an embodiment, the load switch drive circuit in the second mode may bias a gate of the first PMOS transistor such that (ii) the first PMOS transistor has a current supply capacity of equal to or greater than K times (K>1) the amount of current indicated by the current detection signal.

In an embodiment, the load switch drive circuit may include a second PMOS transistor with a size of 1/M times a size of the first PMOS transistor, a gate of the second PMOS transistor connected to the gate of the first PMOS transistor in the second mode, a source of the second PMOS transistor connected to a source of the first PMOS transistor, the gate and a drain of the second PMOS transistor connected through a wire, and a constant current circuit that supplies the second PMOS transistor with a current of equal to or greater than K/M times the amount of current indicated by the current detection signal, where K is a parameter greater than 1.

An embodiment provides a control circuit including a pulse modulator that generates a pulse signal with a pulse modulated to bring an output voltage of an output line close to a target level, a logic circuit that generates a high side control signal and a low side control signal based on the pulse signal, a load switch drive circuit that drives a first PMOS transistor provided as a load switch, and a current detection circuit that generates a current detection signal indicating a current flowing through the first PMOS transistor. The load switch drive circuit includes a second PMOS transistor with a size of 1/M times a size of the first PMOS transistor, a gate of the second PMOS transistor connectable to a gate of the first PMOS transistor, a source of the second PMOS transistor connected to a source of the first PMOS transistor, the gate and a drain of the second PMOS transistor connected through a wire, and a constant current circuit that supplies the second PMOS transistor with a current of equal to or greater than K/M times an amount of current indicated by the current detection signal.

According to the configuration, the leap-up of the output voltage can be suppressed in a situation where the input voltage is higher than the target level of the output voltage.

In an embodiment, $$I_{OUT(MAX)} = K \times I_{OUT(SNS)} + I_{OFS}$$

may be satisfied, where $I_{OUT(SNS)}$ represents the amount of current indicated by the current detection signal, $I_{OUT(MAX)}$ represents the current supply capacity of the first PMOS transistor, and $I_{OFS}$ (>0) and K (>1) are constants. This can prevent the first PMOS transistor from being completely turned off even when the output current $I_{OUT}$ becomes zero.

In an embodiment, the constant current circuit may include a first transistor, a first end of the first transistor connected to the drain of the second PMOS transistor, a first resistance connected between a second end of the first transistor and a ground line, and a first operational amplifier, an output of the first operational amplifier connected to a control terminal of the first transistor, the first operational amplifier receiving the current detection signal through a first input node, a second input node of the first operational amplifier connected to the second end of the first transistor.

In an embodiment, the first operational amplifier may have a non-zero input offset voltage. In an embodiment, a voltage obtained by offsetting the current detection signal may be supplied to the first input node of the first operational amplifier. These offsets can prevent the first PMOS transistor from being completely turned off even when the output current TOUT becomes zero.

In an embodiment, the load switch drive circuit may set the current supply capacity of the first PMOS transistor to a first overcurrent threshold in a region in which the amount of current indicated by the current detection signal exceeds the first overcurrent threshold.

In an embodiment, the constant current circuit may adjust the current supplied to the second PMOS transistor to prevent the amount of current indicated by the current detection signal from exceeding the first overcurrent threshold.

In an embodiment, the constant current circuit may further include a current limit circuit that controls a voltage of the control terminal of the first transistor to prevent the amount of current indicated by the current detection signal from exceeding the first overcurrent threshold.

In an embodiment, the current limit circuit may include a second transistor, a first end of the second transistor connected to the control terminal of the first transistor, a second end of the second transistor connected to the ground line, and a third operational amplifier, an output of the third operational amplifier connected to a control terminal of the second transistor, the third operational amplifier receiving a voltage defining the first overcurrent threshold through a first input node, the third operational amplifier receiving the current detection signal through a second input node.

In an embodiment, the load switch drive circuit may be able to switch to a third mode for applying a voltage corresponding to an input voltage of the boost DC-DC converter to the gate of the first PMOS transistor.

According to the configuration, the load switch (PMOS transistor) is not immediately turned off to stop the boost DC-DC converter. A voltage $V_C$ corresponding to the input voltage can be applied to the gate of the PMOS transistor to cause the PMOS transistor to operate as a source follower circuit (drain ground circuit). In this case, the source voltage of the PMOS transistor, that is, a voltage $V_{MID}$ at the connection node of the load switch and the high side transistor, is clamped to $$V_{MID}=V_C+V_{GS}\approx V_{IN}+V_{GS},$$

and this can prevent generation of an overvoltage. A voltage $V_{SW}$ at the connection node (switching pin) of the high side transistor and the low side transistor is $$V_{SW}=V_{MID}+V_F=V_C+V_{GS}+V_F\approx V_{IN}+V_{GS}+V_F,$$

and an overvoltage of the switching pin is also suppressed. $V_F$ represents a forward direction voltage of the body diode of the high side transistor. In this case, a voltage $V_L$ across the inductor is as follows.

$$V_L=V_{IN}-V_{SW}=V_{IN}-(V_C+V_{GS}+V_F)\approx-(V_{GS}+V_F)$$

As a result, the coil current can be reduced with time at a slope of $-(V_{GS}+V_F)/L$.

In an embodiment, the load switch drive circuit may enter the third mode when the amount of current indicated by the current detection signal exceeds a second overcurrent threshold larger than the first overcurrent threshold.

In an embodiment, the load switch drive circuit may return to the original mode when the amount of current indicated by the current detection signal falls below a release threshold smaller than the first overcurrent threshold.

In an embodiment, the current detection circuit may include a third PMOS transistor with a size of 1/N times the size of the first PMOS transistor, a gate of the third PMOS transistor connected to the gate of the second PMOS transistor, a source of the third PMOS transistor connected to the source of the second PMOS transistor, a third transistor, a first end of the third transistor connected to a drain of the third PMOS transistor, a second resistance connected between a second end of the third transistor and the ground line, and a third operational amplifier, an output of the third operational amplifier connected to a control terminal of the third transistor, a first input node of the third operational amplifier connected to the drain of the first PMOS transistor, a second input node of the third operational amplifier connected to the drain of the third PMOS transistor, and the current detection signal may correspond to a voltage drop of the second resistance.

In an embodiment, the control circuit may be integrated into one semiconductor substrate. The "integration" includes a case in which all of the constituent elements of the circuit are formed on the semiconductor substrate and a case in which main constituent elements of the circuit are integrated. Part of resistances, capacitors, and the like for adjusting the circuit constant may be provided outside the semiconductor substrate. By integrating the circuit on one chip, the circuit area can be reduced, and the characteristics of the circuit elements can be kept uniform.

Embodiments

The present disclosure will now be described based on preferred embodiments and with reference to the drawings. The same signs are provided to the same or equivalent constituent elements, members, and processes illustrated in the drawings, and duplicate description will be appropriately omitted. The embodiments are exemplary, not intended to limit the disclosure. All features and combinations of the features described in the embodiments may not be essential for the disclosure.

In the present specification, "a state in which a member A and a member B are connected" includes a case in which the member A and the member B are physically and directly connected as well as a case in which the member A and the member B are indirectly connected through another member that does not substantially affect their electrical connection state and that does not impair the functions and the effects obtained by coupling them.

Similarly, "a state in which a member C is provided between a member A and a member B" includes a case in which the member A and the member C or the member B and the member C are directly connected as well as a case in which they are indirectly connected through another member that does not substantially affect their electrical connection state and that does not impair the functions and the effects obtained by coupling them.

In addition, "a signal A (voltage, current) corresponds to a signal B (voltage, current)" means that the signal A is correlated with the signal B, and specifically, it represents (i) a case in which the signal A is the signal B, (ii) a case in which the signal A is proportional to the signal B, (iii) a case in which the signal A is obtained by shifting the level of the signal B, (iv) a case in which the signal A is obtained by amplifying the signal B, (v) a case in which the signal A is obtained by inverting the signal B, or (vi) any combination of these. Those skilled in the art will understand that the range of "corresponding" is determined according to the type and the usage of the signals A and B.

Vertical axes and horizontal axes of waveform diagrams and time charts referenced in the present specification are appropriately scaled up and down to facilitate the understanding, and each illustrated waveform is also simplified, exaggerated, or emphasized to facilitate the understanding.

First Embodiment

A letter E is added to each constituent element related to a first embodiment. FIG. 1 is a circuit diagram of a boost DC-DC converter 100E according to the first embodiment. The boost DC-DC converter (hereinafter, simply referred to as a DC-DC converter) 100E boosts an input voltage $V_{IN}$ of an input terminal (input line) 102, stabilizes the input voltage $V_{IN}$ at a predetermined voltage level, and supplies the input voltage $V_{IN}$ to a load (not illustrated) connected to an output terminal (output line) 104.

The DC-DC converter 100E includes a main circuit 110E and a control circuit 200E. The main circuit 110E includes an inductor L1, a low side transistor (switching transistor) ML, a high side transistor (synchronous rectifier transistor) MH, an output capacitor C1, and a load switch SW1. In the present embodiment, the load switch SW1 includes a PMOS transistor (hereinafter, referred to as a first PMOS transistor MP1).

The control circuit 200E is a functional IC (integrated circuit) integrated into one semiconductor substrate (die). In the present embodiment, the low side transistor ML, the high side transistor MH, and the first PMOS transistor MP1 are integrated into the control circuit 200E.

The control circuit 200E includes a pulse modulator 210, a logic circuit 220, a high side driver 230, a low side driver 232, a load switch drive circuit 270E, a voltage monitor circuit 280, a current detection circuit 300, and resistances R11 and R12 in addition to the low side transistor ML, the high side transistor MH, and the first PMOS transistor MP1.

The control circuit 200E is provided with a switching pin SW, a ground pin PGND, an input pin VIN, an output pin VOUT, and a sense pin VOUT_SNS.

The external inductor L1 is connected to the switching pin SW. The output capacitor C1 is connected to the output pin VOUT. The low side transistor ML is connected between the switching pin SW and the ground pin PGND. The high side transistor MH and the first PMOS transistor MP1 are directly connected between the switching pin SW and the output pin VOUT. The input voltage $V_{IN}$ of the DC-DC converter 100E is supplied to the input pin $V_{IN}$.

The DC-DC converter 100E is a converter with constant voltage output, and the pulse modulator 210 generates a pulse signal Sp with a pulse modulated to bring an output voltage $V_{OUT}$ of the DC-DC converter 100E close to a target level $V_{OUT(REF)}$.

The output voltage $V_{OUT}$ is fed back to the sense pin $V_{OUT\_SNS}$. The output voltage $V_{OUT}$ is divided by the resistances R11 and R12, and a feedback signal VFB indicating the output voltage $V_{OUT}$ is generated. The pulse modulator 210 modulates the pulse of the pulse signal Sp to bring the feedback signal VFB close to a reference voltage $V_{REF}$.

The target level $V_{OUT(REF)}$ of the output voltage $V_{OUT}$ is expressed by the following equation.

$$V_{OUT(REF)} = V_{REF} \times (R11+R12)/R12$$

The configuration and the control system of the pulse modulator 210 are not particularly limited. For example, the pulse modulator 210 may be a controller of voltage mode or may be a controller of peak current mode or average current mode. Alternatively, the pulse modulator 210 may be a controller of ripple control, such as hysteresis control (bang-bang control), bottom detection on-time fixed control, and peak detection off-time fixed control.

The modulation system of the pulse modulator 210 is not particularly limited. The modulation system may be pulse width modulation, pulse frequency modulation, or other modulation systems.

The logic circuit 220 generates a high side control signal HGCTL and a low side control signal LGCTL based on the pulse signal Sp. The logic circuit 220 also generates a control signal SWCTL of the first PMOS transistor MP1.

The high side driver 230 drives the high side transistor MH based on the high side control signal HGCTL. The low side driver 232 drives the low side transistor ML based on the low side control signal LGCTL.

The load switch drive circuit 270E drives the first PMOS transistor MP1 that is the load switch SW1 based on the control signal SWCTL. Specifically, the load switch drive circuit 270E turns on the first PMOS transistor MP1 when the control signal SWCTL is in an on level (for example, high) and turns off the first PMOS transistor MP1 when the control signal SWCTL is in an off level (for example, low).

The load switch drive circuit 270E can make a switch between two modes in a period in which the control signal SWCTL is in the on level (high). A control signal MODE for designating the mode is input to the load switch drive circuit 270E.

The load switch drive circuit 270E fully turns on the first PMOS transistor MP1 in the first mode. For example, the load switch drive circuit 270E generates a voltage lower by a predetermined voltage range $\Delta V$ than a source voltage $V_{MID}$ of the first PMOS transistor MP1 and supplies the voltage to the gate of the first PMOS transistor MP1. The predetermined voltage range $\Delta V$ is larger than a threshold voltage $V_{gs(th)}$ of the first PMOS transistor MP1.

The input pin VIN of the control circuit 200E is connected to the input line 102, and the input voltage $V_{IN}$ is input. The voltage monitor circuit 280 compares the input voltage VIN with a threshold voltage $V_{TH}$ and generates a comparison signal VINCOMP corresponding to the comparison result. It is assumed here that VINCOMP is high if $V_{IN} > V_{TH}$. The voltage monitor circuit 280 can include a voltage comparator.

The logic circuit 220 controls the operation mode of the DC-DC converter 100E based on the comparison signal VINCOMP. Specifically, the logic circuit 220 causes the DC-DC converter 100E to operate in a boost mode if $V_{IN} < V_{OUT(REF)}$ and causes the DC-DC converter 100E to operate in a through mode if $V_{IN} > V_{OUT(REF)}$.

The current detection circuit 300 generates a current detection signal ISNS indicating a current flowing through the first PMOS transistor MP1, that is, an output current $I_{OUT}$ of the DC-DC converter 100E. The current detection circuit 300 may detect the current flowing through the first PMOS transistor MP1 as described later. Alternatively, the current detection circuit 300 may indirectly detect the current $I_{OUT}$ of the first PMOS transistor MP1 based on a current of the high side transistor MH or the inductor L1 because the current flowing through the first PMOS transistor MP1 is equal to the current flowing through the high side transistor MH and the coil current flowing through the inductor L1.

The current detection signal ISNS is supplied to the load switch drive circuit 270E. The load switch drive circuit 270E in the second mode changes the gate voltage of the first PMOS transistor MP1 according to the current detection signal ISNS such that the first PMOS transistor MP1 has a current supply capacity $I_{OUT(MAX)}$ larger than an amount of current $I_{OUT(SNS)}$ indicated by the current detection signal ISNS.

$$I_{OUT(MAX)} > I_{OUT(SNS)}$$

The current supply capacity $I_{OUT(MAX)}$ can be figured out as a drain current Id in a saturation region of FET (field-effect transistor).

$$Id = \tfrac{1}{2} \times K$$

In the second mode, the feedback control for bringing the current detection signal ISNS close to a target value is not performed, and the current detection signal ISNS serves as a reference signal for determining a bias point of the first PMOS transistor MP1.

For example, the load switch drive circuit 270E in the second mode (ii) biases the gate of the first PMOS transistor MP1 such that the first PMOS transistor MP1 has the current supply capacity $I_{OUT(MAX)}$ of equal to or greater than K times (K>1) the amount of current $I_{OUT(SNS)}$ indicated by the current detection signal ISNS. K is a design parameter.

$$I_{OUT(MAX)} \geq K \times I_{OUT(SNS)}$$

This completes the description of the configuration of the DC-DC converter 100E. Next, an operation of the DC-DC converter 100E will be described.

Figure 2:
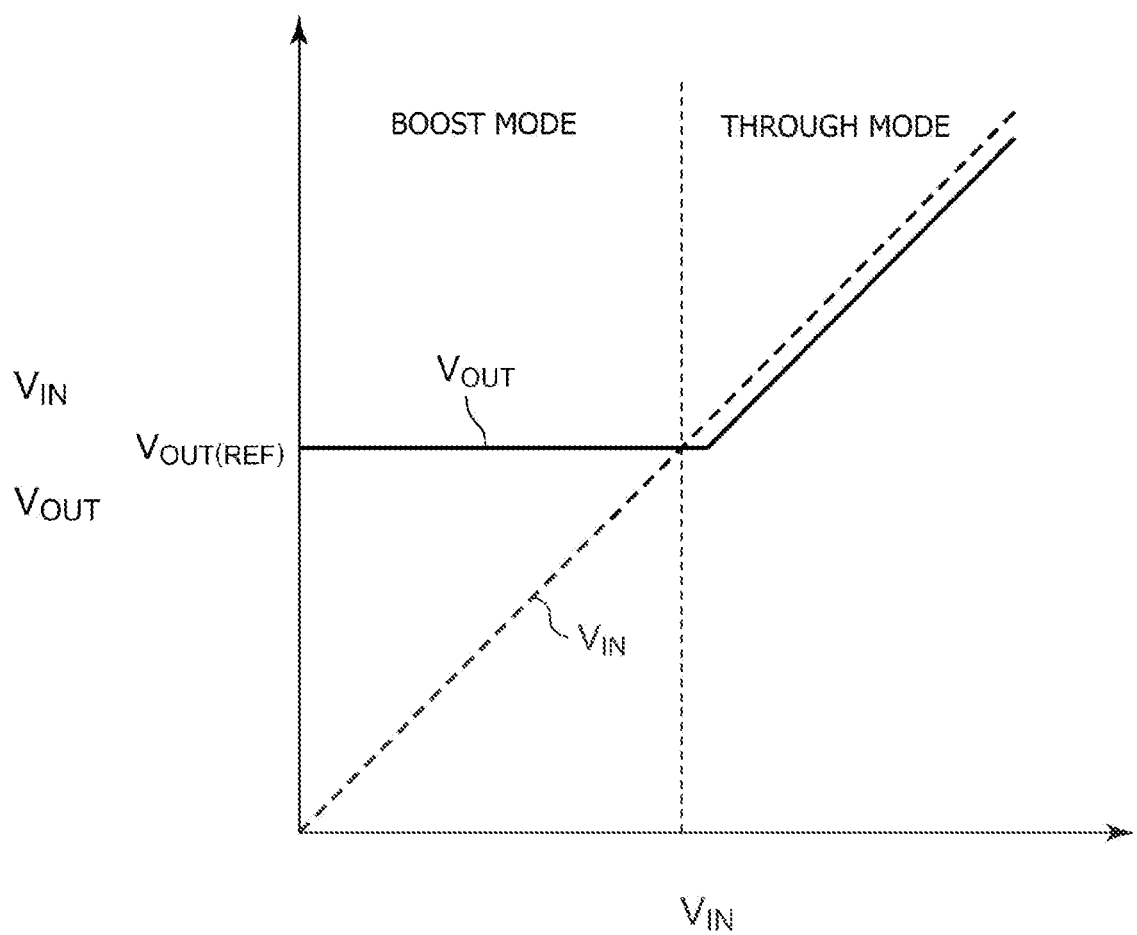
FIG. 2 is a diagram describing an operation of the DC-DC converter in FIG. 1.

FIG. 2 is a diagram describing the operation of the DC-DC converter 100E in FIG. 1. The horizontal axis represents the input voltage VIN, and the vertical axis represents the output voltage $V_{OUT}$.

The DC-DC converter 100E operates in the boost mode when the input voltage $V_{IN}$ is lower than the target level $V_{OUT(REF)}$ of the output voltage $V_{OUT}$. In the boost mode, the high side transistor and the low side transistor are switched, and the output voltage $V_{OUT}$ is stabilized at the target level $V_{OUT(REF)}$.

In the boost mode, the logic circuit 220 causes the load switch drive circuit 270E to operate in the first mode. As a result, the first PMOS transistor MP1 is fully turned on, and the loss in the first PMOS transistor MP1 is reduced.

The DC-DC converter 100E operates in the through mode when the input voltage $V_{IN}$ is higher than the target level $V_{OUT(REF)}$ of the output voltage $V_{OUT}$. In this state, the duty cycle of the pulse signal Sp drops to 0, and the switching stops while the low side transistor ML is turned off and the high side transistor MH is turned on.

In the through mode, the load switch drive circuit 270E operates in the second mode. The first PMOS transistor MP1 in this case has not been fully turned on, and the first PMOS transistor MP1 is biased to have a current supply capacity that allows to supply the load current at this point.

Figure 3:
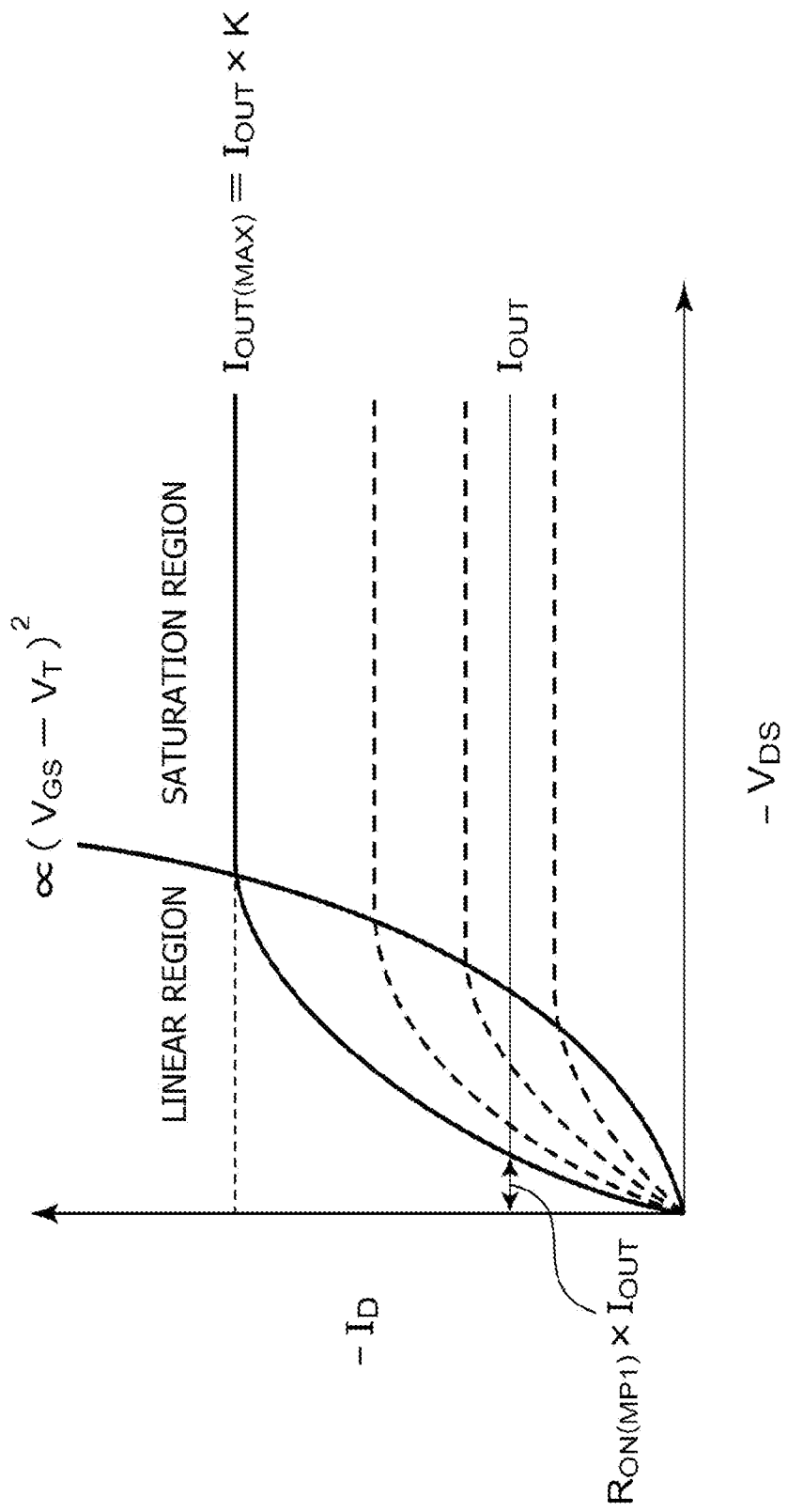
FIG. 3 depicts I-V (current-voltage) characteristics of a first PMOS transistor.

FIG. 3 depicts I-V (current-voltage) characteristics of the first PMOS transistor MP1. The horizontal axis represents a drain-source voltage VDS of the first PMOS transistor MP1, and the vertical axis represents a drain current $I_D$. An amount of current $I_{D(SAT)}$ in the saturation region (also referred to as an amount of saturation current) is expressed by the following equation.

$$I_{D(SAT)} = -W/2L \cdot \mu C_{OX}(V_{GS}-V_T)^2 = -A(V_{GS}-V_T)^2$$

$$A = W/2L \cdot \mu C_{OX}$$

$V_{GS}$ represents a gate-source voltage (bias point) of the first PMOS transistor MP1, $V_T$ represents a threshold voltage of a P-channel MOSFET, W represents a gate width, L represents a gate length, $\mu$ represents a mobility, and $C_{OX}$ represents a capacity of a gate insulating film.

As described above, the current supply capacity $I_{OUT(MAX)}$ can be figured out as the amount of current $I_{D(SAT)}$ of the saturation region. The operating point is determined to satisfy the following relation when an output current $I_{OUT}$ is flowing.

$$I_{D(SAT)} = A(V_{GS}-V_T)^2 > I_{OUT}$$

$$V_{GS} > \sqrt{(I_{OUT}/A)} + V_T$$

For example, to provide the current supply capacity $I_{OUT(MAX)}$ of K times the output current $I_{OUT}$, the operating point is as follows, and the first PMOS transistor MP1 operates in a linear region.

$$I_{D(SAT)} = A(V_{GS}-V_T)^2 = K \times I_{OUT}$$

$$V_{GS} = \sqrt{(K \times I_{OUT}/A)} + V_T$$

When the second mode is selected in the state of $V_{IN} \geq V_{OUT(REF)}$, the output voltage $V_{OUT}$ is $$V_{OUT} = V_{IN} - (R_{ON(MH)} + R_{ON(MP1)}) \times I_{OUT},$$

which is a voltage level slightly lower than the input voltage $V_{IN}$. $R_{ON(MH)}$ represents an on-resistance of the high side transistor MH. The high side transistor MH is fully turned on, and the on-resistance is significantly small. $R_{ON(MP1)}$ represents an on-resistance of the first PMOS transistor MP1. The on-resistance $R_{ON(MP1)}$ can be defined according to the parameter K. The larger the K, the smaller the on-resistance $R_{ON(MP1)}$ in the second mode. From this point of view, it is preferable that K be equal to or greater than 1.5, and it is more preferable that K be equal to or greater than 2. By setting K equal to or greater than 4, the on-resistance can sufficiently be reduced, and the loss can be reduced.

This completes the description of the operation of the DC-DC converter 100. An advantage of causing the load switch drive circuit 270E in the through mode to operate in the second mode instead of the first mode will be described. The advantage will become clear by comparison with a comparative technique.

Figure 4:
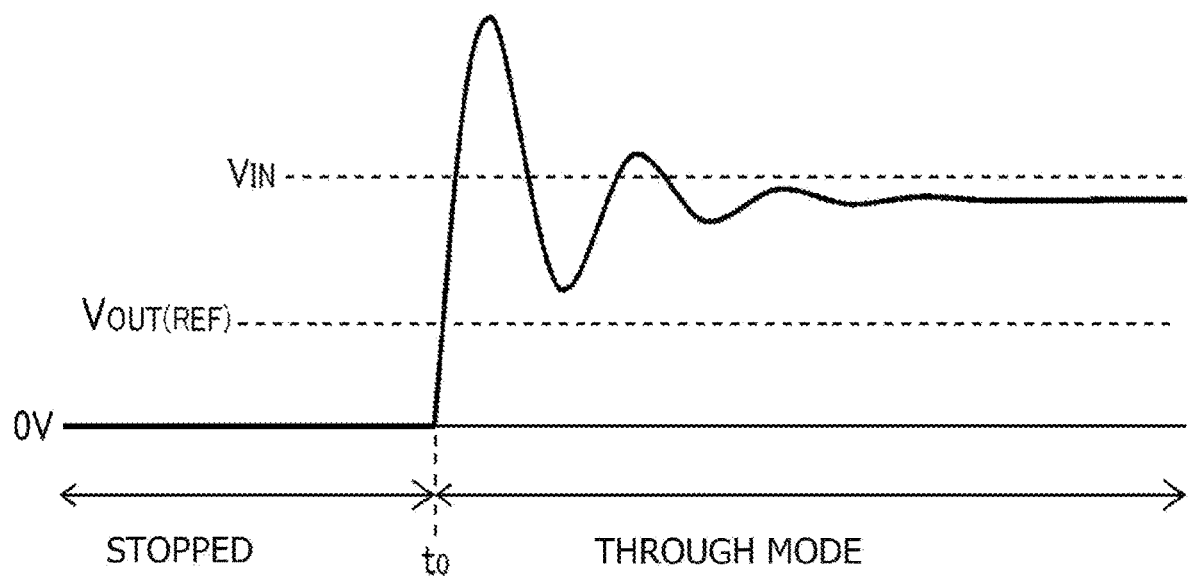
FIG. 4 is an operation waveform diagram of a DC-DC converter according to a comparative technique.

It is assumed that, in the comparative technique, the load switch drive circuit 270E in the through mode operates in the first mode, and the first PMOS transistor MP1 is fully turned on. FIG. 4 is an operation waveform diagram of the DC-DC converter according to the comparative technique. A situation where the input voltage $V_{IN}$ is higher than the target voltage $V_{OUT(REF)}$ of the output voltage $V_{OUT}$ will be described. At time to, an activation instruction is input to the DC-DC converter. Once the logic circuit detects $V_{IN} > V_{OUT(REF)}$, the logic circuit selects the through mode and sets the load switch drive circuit 270E to the first mode. As a result, the first PMOS transistor MP1 is immediately fully turned on. Consequently, the current flowing from the input line 102 to the output line 104 sharply rises. The current flows through the inductor L1, and an induced voltage is generated when there is a rapid change in the coil current. The output voltage $V_{OUT}$ is overshot due to the induced voltage.

Figure 5:
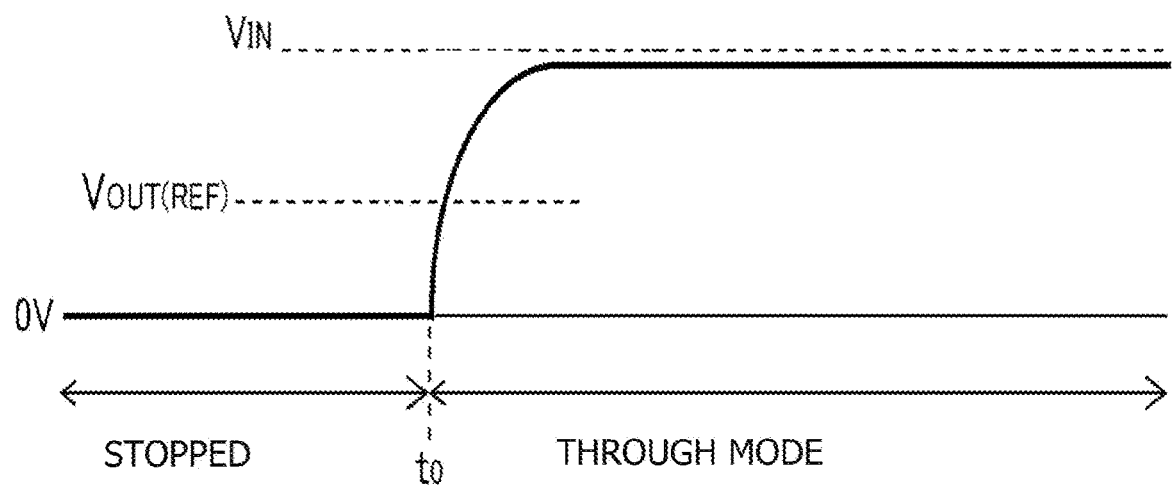
FIG. 5 is an operation waveform diagram of the DC-DC converter in FIG. 1.

FIG. 5 is an operation waveform diagram of the DC-DC converter 100E in FIG. 1. As in FIG. 4, the situation where the input voltage VIN is higher than the target voltage $V_{OUT(REF)}$ of the output voltage $V_{OUT}$ will be described. At time to, an activation instruction is input to the DC-DC converter. Once the logic circuit detects $V_{IN} > V_{OUT(REF)}$, the logic circuit selects the through mode and sets the load switch drive circuit 270E to the second mode. In this case, the first PMOS transistor MP1 is not immediately fully turned on, and the gate-source voltage of the first PMOS transistor MP1 rises more slowly than in the case of the comparative technique due to the delay in the feedback loop of the load switch drive circuit 270E. As a result, the current flowing from the input line 102 to the output line 104 increases more slowly than in the comparative technique (FIG. 4). Therefore, a sharp change in the coil current is suppressed, and the induced voltage is also reduced. This can suppress the overshoot of the output voltage $V_{OUT}$.

Figure 6:
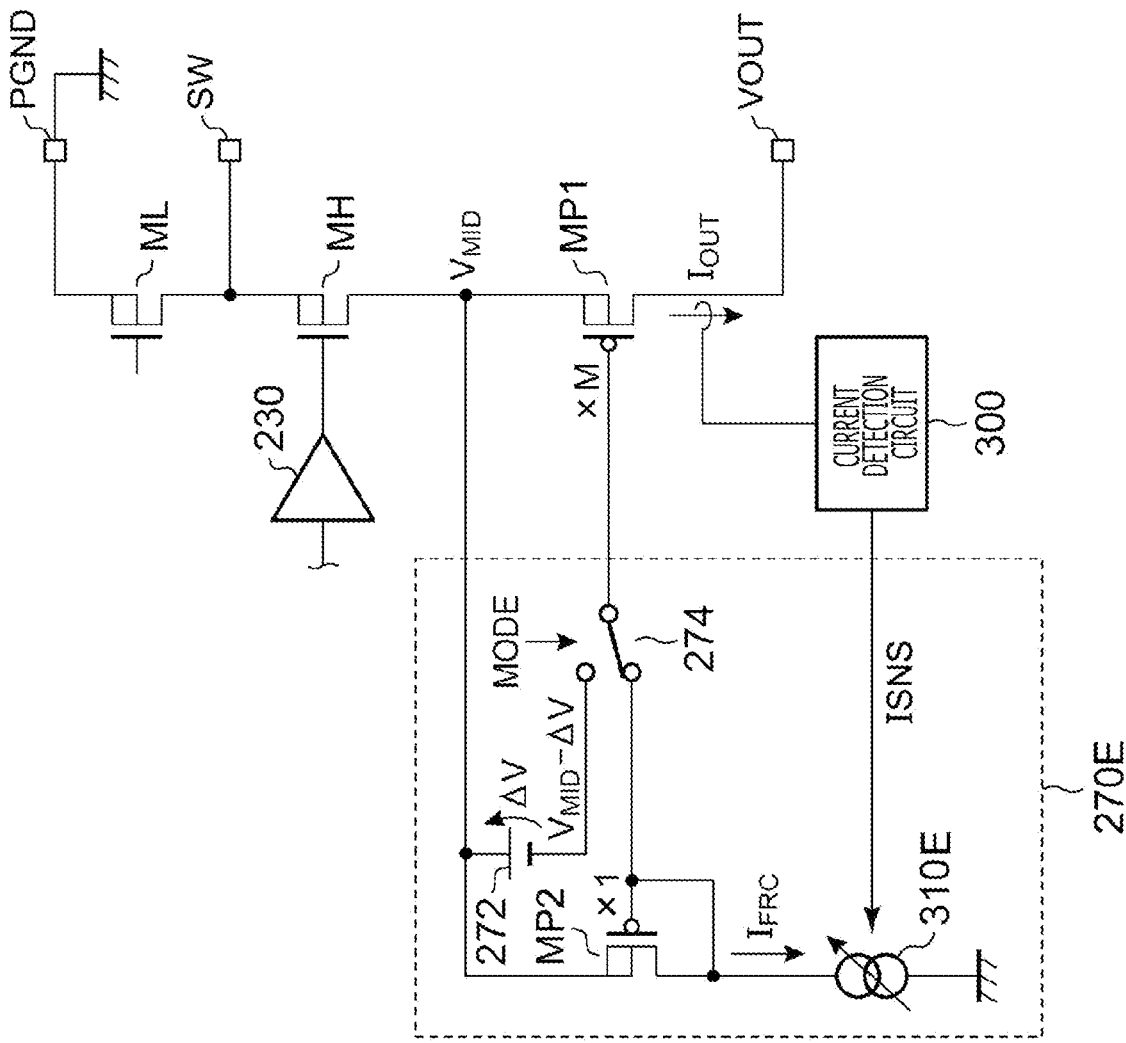
FIG. 6 is a circuit diagram illustrating a configuration example of a load switch drive circuit and peripheral circuits of the load switch drive circuit.

Next, a specific configuration example of the control circuit 200E will be described. FIG. 6 is a circuit diagram illustrating a configuration example of the load switch drive circuit 270E and peripheral circuits of the load switch drive circuit 270E.

The load switch drive circuit 270E includes a second PMOS transistor MP2, a voltage source 272, a selector 274, and a constant current circuit 310E.

The voltage source 272 in the first mode generates a gate voltage for fully turning on the first PMOS transistor MP1. Specifically, the voltage source 272 shifts the level of the source voltage $V_{MID}$ of the first PMOS transistor MP1 and generates a voltage ($V_{MID} - \Delta V$) lower by a predetermined voltage range $\Delta V$ than the source voltage $V_{MID}$. The selector 274 in the first mode selects the output voltage of the voltage source 272 and supplies the output voltage to the gate of the first PMOS transistor MP1.

The second PMOS transistor MP2 and the constant current circuit 310E generate a gate voltage of the first PMOS transistor MP1 in the second mode.

The size of the second PMOS transistor MP2 is 1/M times the size of the first PMOS transistor MP1. The gate of the second PMOS transistor MP2 is connected to the gate of the first PMOS transistor MP1 through the selector 274 in the second mode, and the source of the second PMOS transistor MP2 is connected to the source of the first PMOS transistor MP1. The gate and the drain of the second PMOS transistor MP2 are connected through a wire.

The selector 274 connects the gate of the second PMOS transistor MP2 to the gate of the first PMOS transistor MP1 in the second mode. In the second mode, the second PMOS transistor MP2 and the first PMOS transistor MP1 are connected to provide a current mirror circuit with the second PMOS transistor MP2 as an input and the first PMOS transistor MP1 as an output. However, the first PMOS transistor MP1 operates in a linear region in which the drain-source voltage is small. Therefore, a current of M times a current $I_{FRC}$ of the second PMOS transistor MP2 does not flow through the first PMOS transistor MP1, and instead, the current supply capacity of the first PMOS transistor MP1 becomes $I_{FRC} \times M$.

The constant current circuit 310E supplies the second PMOS transistor MP2 with the force current $I_{FRC}$ of equal to or greater than K/M times the amount of current $I_{OUT(SNS)}$ indicated by the current detection signal ISNS generated by the current detection circuit 300.

$$I_{FRC} \geq K/M \times I_{OUT(SNS)}$$

For example, the constant current circuit 310E may supply the second PMOS transistor MP2 with the force current $I_{FRC}$ of K/M times the amount of current $I_{OUT(SNS)}$ indicated by the current detection signal ISNS.

$$I_{FRC} = K/M \times I_{OUT(SNS)}$$

However, when the output current $I_{OUT}$ becomes zero in this case, the force current $I_{FRC}$ becomes zero. The gate-source voltages of the first PMOS transistor MP1 and the second PMOS transistor MP2 become 0 V, and the first PMOS transistor MP1 is completely turned off. Additional control for restart is necessary.

Therefore, it is desirable that the constant current circuit 310E supply the second PMOS transistor MP2 with the force current $I_{FRC}$ obtained by adding an offset $I_{OFS}$ to K/M times the amount of current $I_{OUT(SNS)}$ indicated by the current detection signal ISNS.

$$I_{FRC} = K/M \times I_{OUT(SNS)} + I_{OFS}$$

In this way, the force current $I_{FRC}$ becomes equal to $I_{OFS}$ even when the output current $I_{OUT}$ becomes zero. The first PMOS transistor MP1 and the second PMOS transistor MP2 can be maintained without turning them off.

Figure 7:
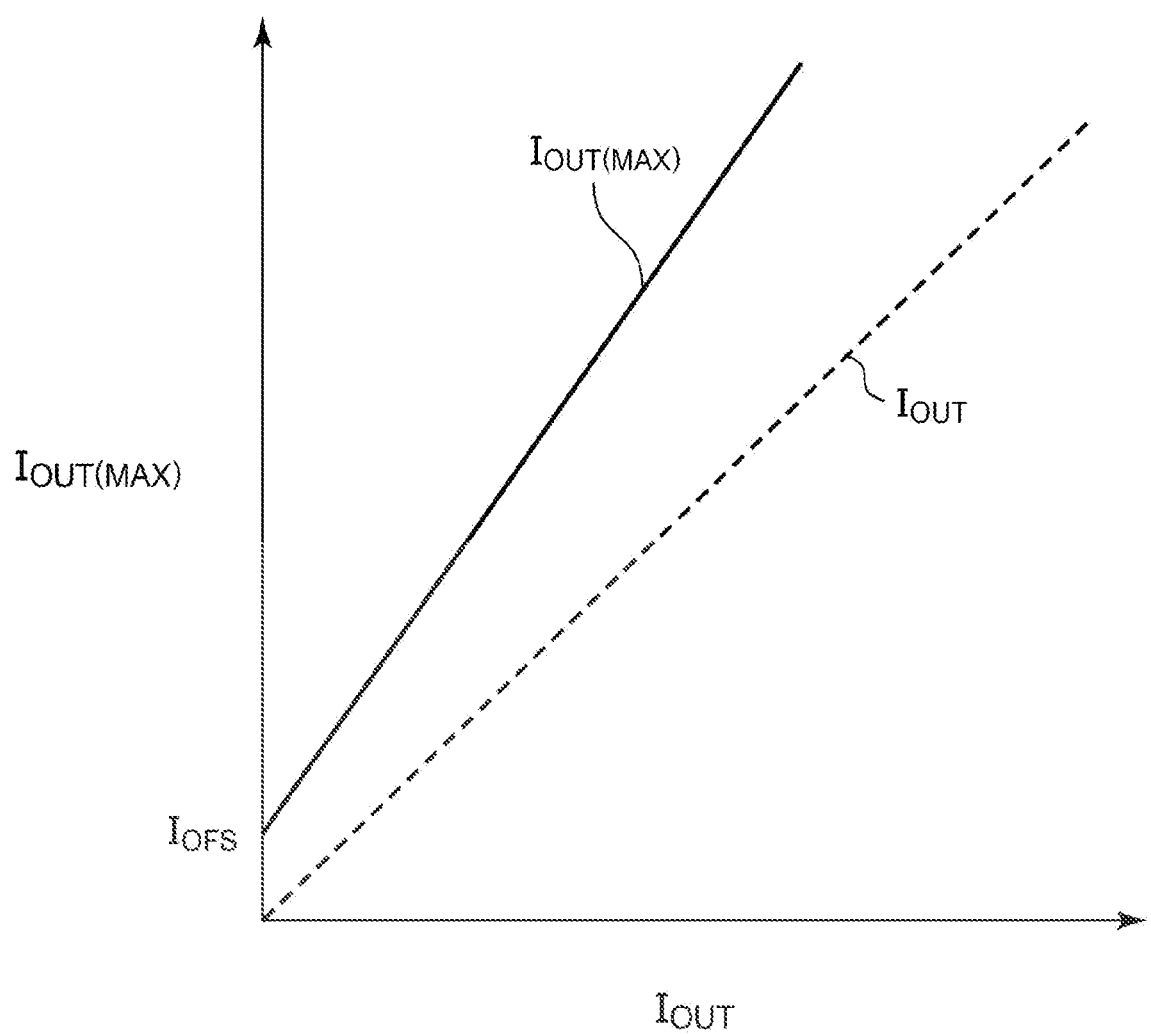
FIG. 7 is a diagram describing an operation of the load switch drive circuit in FIG. 6.

This completes the description of the configuration of the load switch drive circuit 270E. Next, an operation of the load switch drive circuit 270E will be described. FIG. 7 is a diagram describing the operation of the load switch drive circuit 270E in FIG. 6. The horizontal axis represents the output current $I_{OUT}$, and the vertical axis represents the current supply capacity $I_{OUT(MAX)}$ of the first PMOS transistor MP1.

In this way, according to the load switch drive circuit 270E of FIG. 6, the current supply capacity $I_{OUT(MAX)}$ (amount of saturation current $I_{D(SAT)}$) of the first PMOS transistor MP1 can be linearly increased with respect to the output current $I_{OUT}$.

Figure 8:
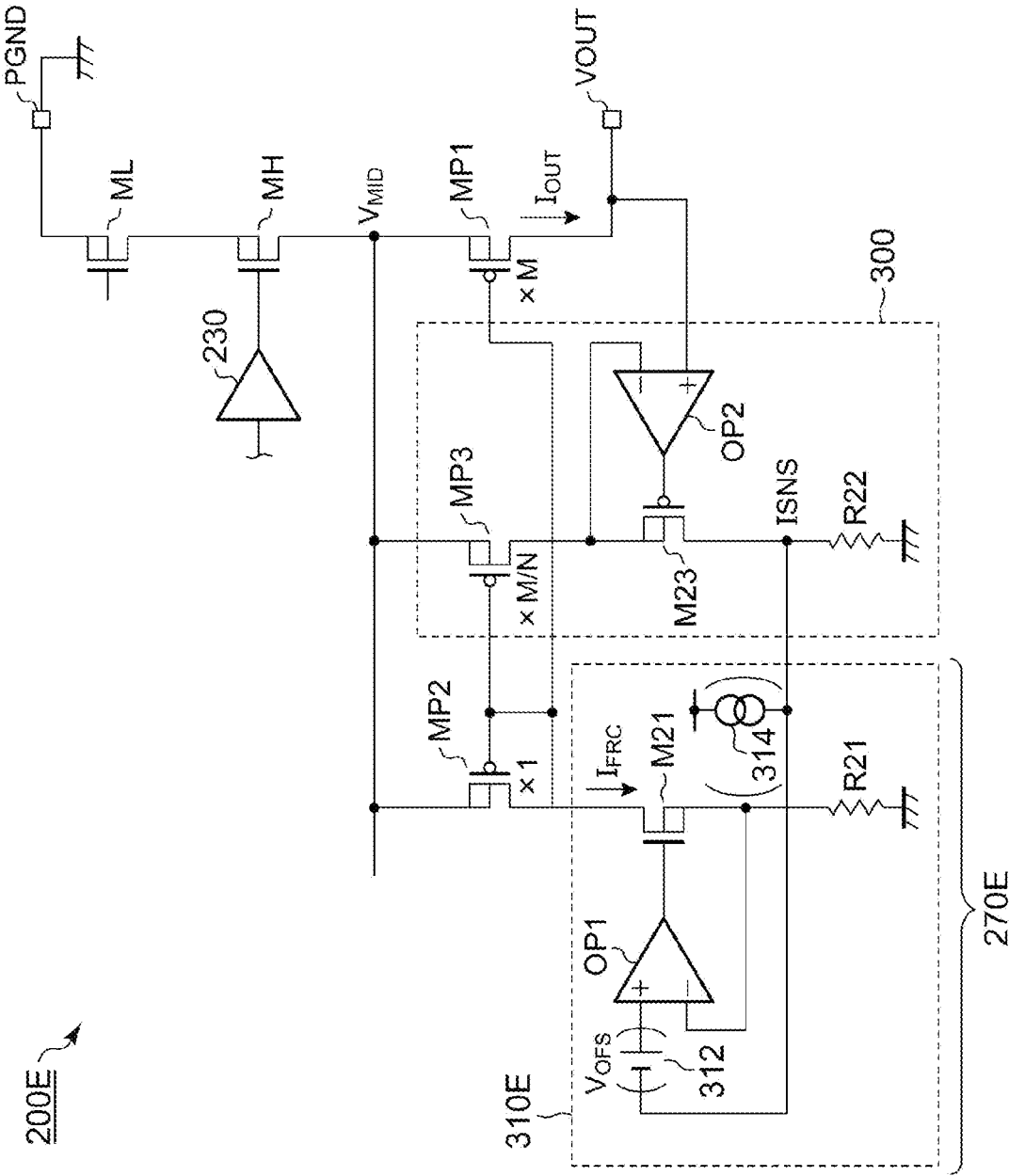
FIG. 8 is a circuit diagram illustrating a configuration example of the load switch drive circuit and a current detection circuit.

FIG. 8 is a circuit diagram illustrating a configuration example of the load switch drive circuit 270E and the current detection circuit 300. The voltage source 272 and the selector 274 are not illustrated in FIG. 8.

The current detection circuit 300 includes a third PMOS transistor MP3, a third transistor M23, a second resistance R22, and a second operational amplifier OP2.

The size of the third PMOS transistor MP3 is 1/N times the size of the first PMOS transistor MP1 (M/N times the size of the second PMOS transistor MP2). The gate of the third PMOS transistor MP3 is connected to the gate of the second PMOS transistor MP2, and the source of the third PMOS transistor MP3 is connected to the sources of the second PMOS transistor MP2 and the first PMOS transistor MP1.

The third transistor M23 is a P-channel MOSFET, and a first end (source) of the third transistor M23 is connected to the drain of the third PMOS transistor MP3.

The second resistance R22 is connected between a second end (drain) of the third transistor M23 and the ground line. The output of the second operational amplifier OP2 is connected to the control terminal (gate) of the third transistor M23. A first input node (non-inverting input terminal+) of the second operational amplifier OP2 is connected to the drain (VOUT pin) of the first PMOS transistor MP1, and a second input node (inverting input terminal −) is connected to the drain of the third PMOS transistor MP3.

The second operational amplifier OP2 and the third transistor M23 cause feedback such that the drain voltage of the third PMOS transistor MP3 becomes equal to the drain voltage of the first PMOS transistor MP1. As a result, a current $I_{OUT}/N$ of 1/N times the output current $I_{OUT}$ flows through the third transistor M23. A voltage drop $I_{OUT}/N \times R22$ proportional to the output current $I_{OUT}$ occurs in the second resistance R22.

The current detection circuit 300 outputs the current detection signal ISNS corresponding to the voltage drop of the second resistance R22.

$$ISNS = R22 \times I_{OUT}/N$$

The constant current circuit 310E includes a first transistor M21, a first resistance R21, and a first operational amplifier OP1.

The first transistor M21 is an N-channel MOSFET, and a first end (drain) of the first transistor M21 is connected to the drain of the second PMOS transistor MP2. The first resistance R21 is connected between a second end (source) of the first transistor M21 and the ground line. The output of the first operational amplifier OP1 is connected to the control terminal (gate) of the first transistor M21. The first operational amplifier OP1 receives the current detection signal ISNS through a first input node (non-inverting input terminal+), and a second input node (inverting input terminal −) is connected to the second end (source) of the first transistor M21.

The first operational amplifier OP1 may have a non-zero input offset voltage $V_{OFS}$ In this case, the force current $I_{FRC}$ generated by the constant current circuit 310E is as follows.

$$I_{FRC} = (ISNS + V_{OFS})/R21$$

$V_{OFS}/R21$ corresponds to the offset current $I_{OFS}$.

This completes the description of the configuration example of the current detection circuit 300 and the constant current circuit 310E. According to the configuration, the current supply capacity $I_{OUT(MAX)}$ of the first PMOS transistor MP1 is expressed by the following equation.

$$I_{OUT(MAX)} = I_{FRC} \times M = (ISNS + V_{OFS})/R21 \times M = (R22 \times I_{OUT}/N + V_{OFS})/R21 \times M = (R22/R21) \cdot M/N \times I_{OUT} + V_{OFS}/R21 \times M$$

That is, $K=(R22/R21) \cdot M/N$ and $I_{OFS}=V_{OFS}/R21 \times M$ are established. For example, M=N may be set to establish $R22=R21 \times K$.

The method of providing the offset voltage $V_{OFS}$ is not particularly limited. For example, a voltage source 312 that generates the offset voltage $V_{OFS}$ may be added. The current detection signal ISNS may be offset by $V_{OFS}$ to obtain a voltage ISNS+$V_{OFS}$, and the voltage ISNS+$V_{OFS}$ may be supplied to the first input node (+) of the first operational amplifier OP1.

Alternatively, a current source 314 that supplies a current $I_Z$ to the second resistance R22 of the current detection circuit 300 may be added to offset the current detection signal ISNS. The amount of offset in this case is $V_{OFS}=I_Z \times R22$ Second Embodiment FIG. 6 will be described. A letter F is added to each component related to a second embodiment. The load switch drive circuit 270F has a current limit function effective in the second mode. The load switch drive circuit 270F limits the current supply capacity $I_{OUT(MAX)}$ of the second PMOS transistor MP2 to a first overcurrent threshold $I_{OCP1}$ in a region in which the amount of current $I_{OUT(SNS)}$ indicated by the current detection signal ISNS is larger than the first overcurrent threshold $I_{OCP1}$.

More specifically, the constant current circuit 310F adjusts the force current $I_{FRC}$ supplied to the second PMOS transistor MP2 to prevent the amount of current $I_{OUT(SNS)}$ indicated by the current detection signal ISNS from exceeding the first overcurrent threshold $I_{OCP1}$.

Figure 9:
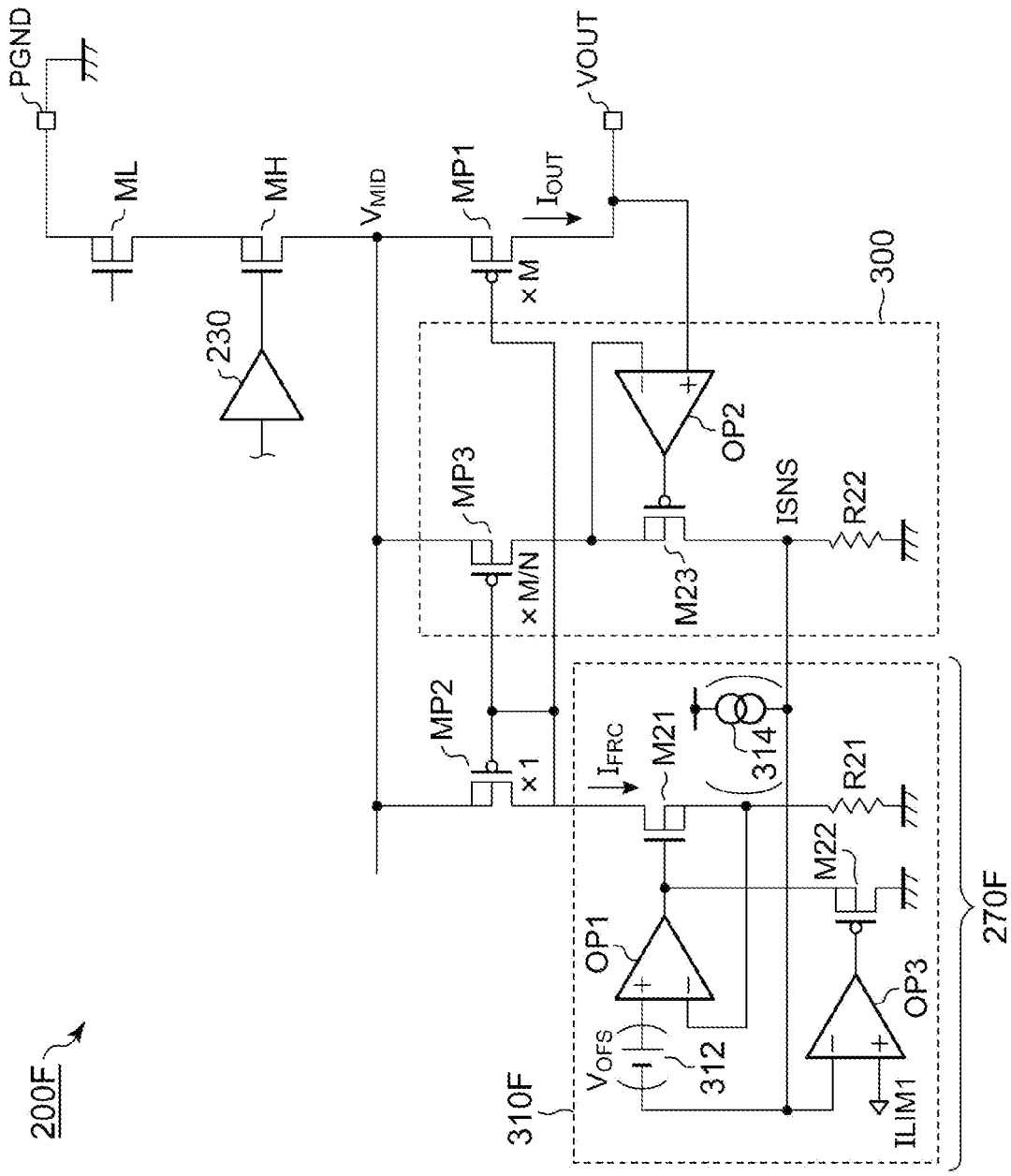
FIG. 9 is a circuit diagram of a control circuit according to a second embodiment.

FIG. 9 is a circuit diagram of a control circuit 200F according to the second embodiment. A constant current circuit 310F further includes a current limit circuit 320 in addition to the constant current circuit 310E of FIG. 8. The current limit circuit 320 controls the voltage of the control terminal (gate) of the first transistor M21 to prevent the amount of current $I_{OUT(SNS)}$ indicated by the current detection signal ISNS from exceeding the first overcurrent threshold $I_{OCP1}$.

The current limit circuit 320 includes a second transistor M22 and a third operational amplifier OP3. The second transistor M22 is a PMOS transistor. A first end (source) of the second transistor M22 is connected to the control terminal (gate) of the first transistor M21, and a second end (drain) of the second transistor M22 is connected to the ground line. The output of the third operational amplifier OP3 is connected to the control terminal (gate) of the second transistor M22. The third operational amplifier OP3 receives a voltage ILIM1 defining the first overcurrent threshold $I_{OCP1}$ through a first input node (non-inverting input terminal+) and receives the current detection signal ISNS through a second input node (inverting input terminal −).

Note that the configuration of the constant current circuit 310F with the current limit function is not particularly limited to the configuration of FIG. 9.

Figure 10:
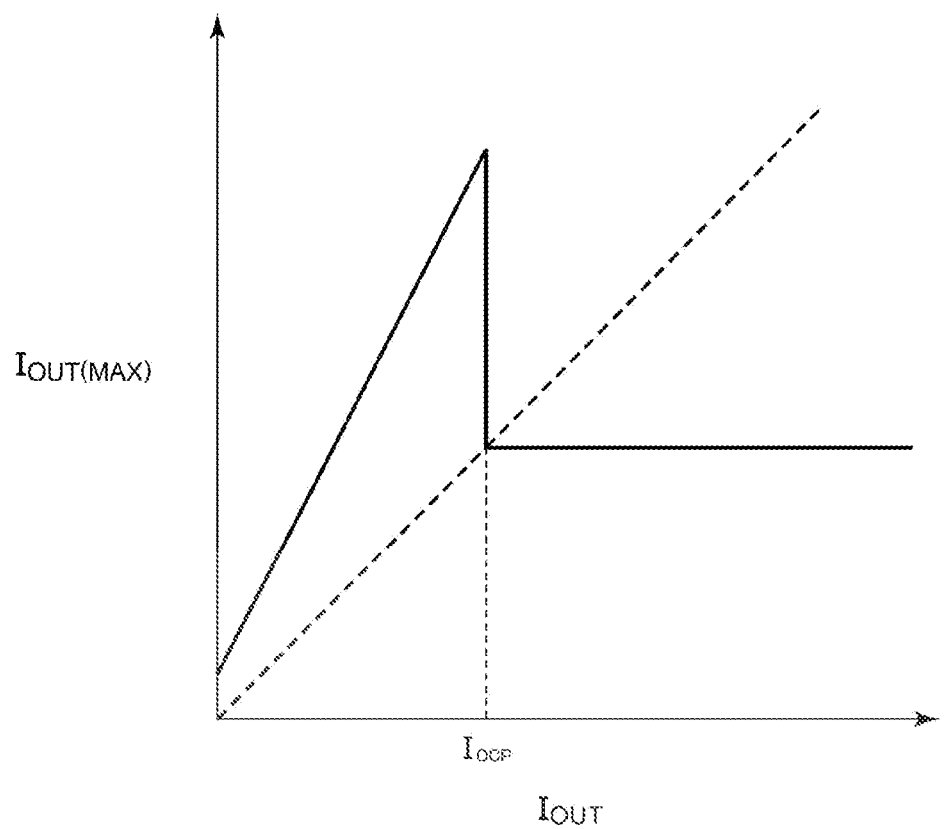
FIG. 10 is a diagram describing overcurrent protection by the control circuit in FIG. 9.

FIG. 10 is a diagram describing overcurrent protection of the control circuit 200F in FIG. 9. Once the output current $I_{OUT}$ exceeds the first overcurrent threshold $I_{OCP1}$, the current limit circuit 320 reduces the current supply capacity $I_{OUT(MAX)}$ of the first PMOS transistor MP1 to the first overcurrent threshold $I_{OCP1}$.

According to the control circuit 200F of the second embodiment, the current supply capacity of the first PMOS transistor MP1 can be reduced to realize the overcurrent protection.

Third Embodiment

A letter G is added to each component related to a third embodiment. In the second mode (through mode), the first PMOS transistor MP1 operates in a linear region and has an excess current supply capacity. Therefore, when the output line 104 of a DC-DC converter 100F is shorted to ground, a large current may instantaneously flow through the first PMOS transistor MP1 in delay time before the protection by the current limit circuit 320 functions. Subsequently, when the current limit circuit 320 reduces the current supply capacity $I_{OUT(MAX)}$ of the first PMOS transistor MP1, a coil current IL exceeding the current supply capacity $I_{OUT(MAX)}$ may flow into the source of the first PMOS transistor MP1, and the source voltage $V_{MID}$ may leap up.

Figure 11:
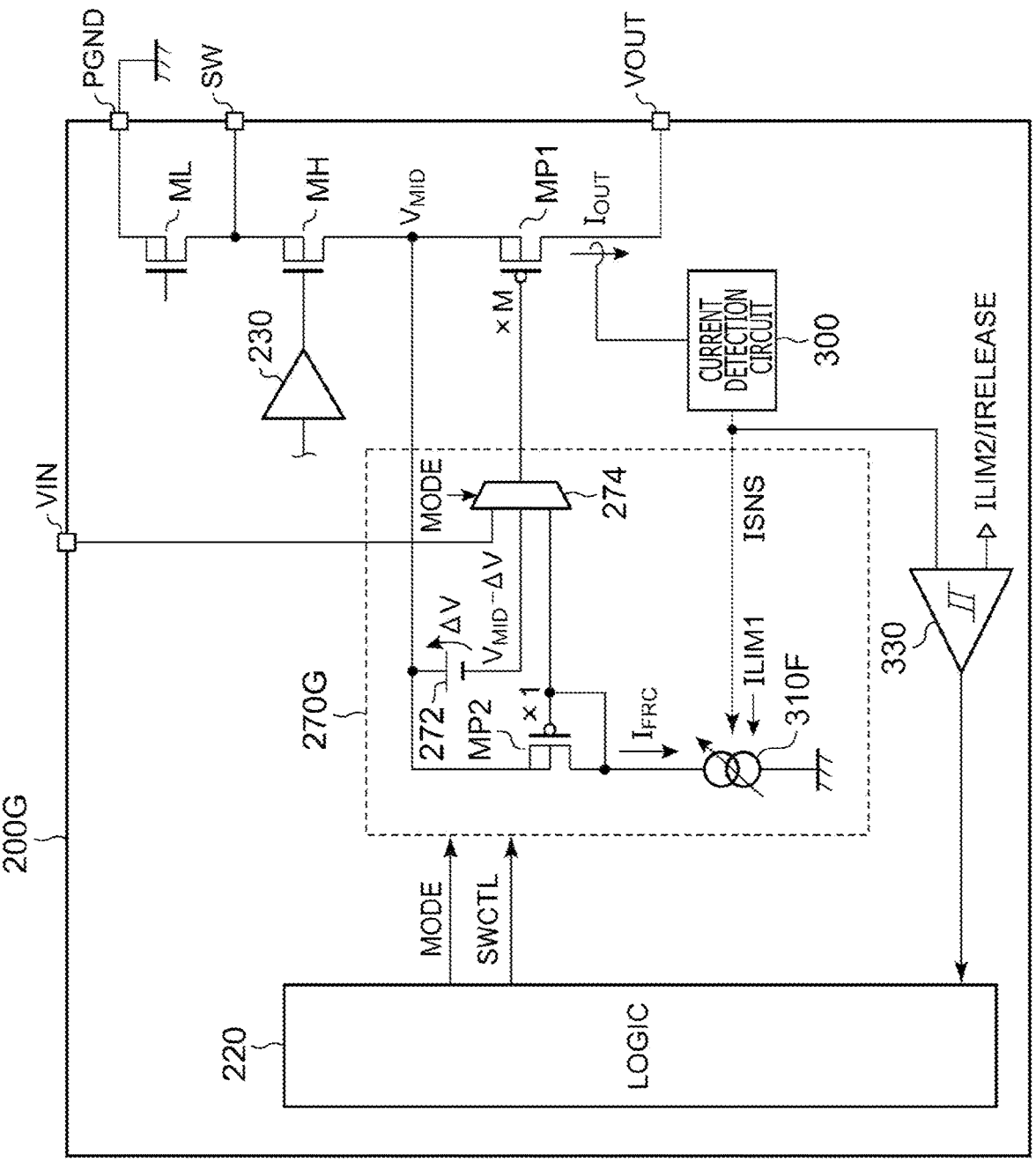
FIG. 11 is a circuit diagram of a control circuit according to a third embodiment.

FIG. 11 is a circuit diagram of a control circuit 200G according to the third embodiment. The control circuit 200G performs the overcurrent protection in two stages to solve the problem.

A load switch drive circuit 270G has a current limit function in the second mode, similarly to the load switch drive circuit 270E.

The load switch drive circuit 270G can select a third mode in addition to the first mode and the second mode. The load switch drive circuit 270G in the third mode applies a voltage $V_C$ corresponding to the input voltage VIN to the gate of the first PMOS transistor MP1. The third mode will also be referred to as an off mode. The case in which the voltage $V_C$ "corresponds to the input voltage $V_{IN}$" includes a case in which the voltage $V_C$ is generated by using the input voltage $V_{IN}$. This includes not only a case in which the voltage $V_C$ is equal to the input voltage VIN, but also a case in which the voltage $V_C$ is a voltage obtained by shifting the level of the input voltage VIN in the positive or negative direction, and a case in which the voltage $V_C$ is a voltage obtained by multiplying the input voltage $V_{IN}$ by a coefficient. It is assumed in the present embodiment that the voltage $V_C$ is equal to the input voltage VIN. The selector 274 in the third mode connects the gate of the first PMOS transistor MP1 to the input pin VIN.

The load switch drive circuit 270G enters the third mode when the amount of current $I_{OUT(SNS)}$ indicated by the current detection signal ISNS exceeds a second overcurrent threshold $I_{OCP2}$ larger than the first overcurrent threshold $I_{OCP1}$ during the operation in the second mode. The load switch drive circuit 270G returns to the second mode when the amount of current $I_{OUT(SNS)}$ indicated by the current detection signal ISNS falls below a release threshold $I_{RELEASE}$ smaller than the first overcurrent threshold $I_{OCP1}$.

The control circuit 200G includes an overcurrent protection circuit 330. The overcurrent protection circuit 330 compares the current detection signal ISNS with a threshold voltage ILIM2 defining the second overcurrent threshold $I_{OCP2}$ and with a threshold voltage IRELEASE defining the release threshold $I_{RELEASE}$. The overcurrent protection circuit 330 may include a hysteresis comparator. The logic circuit 220 controls the mode of the load switch drive circuit 270G according to an output OCP2 of the overcurrent protection circuit 330.

Figure 12:
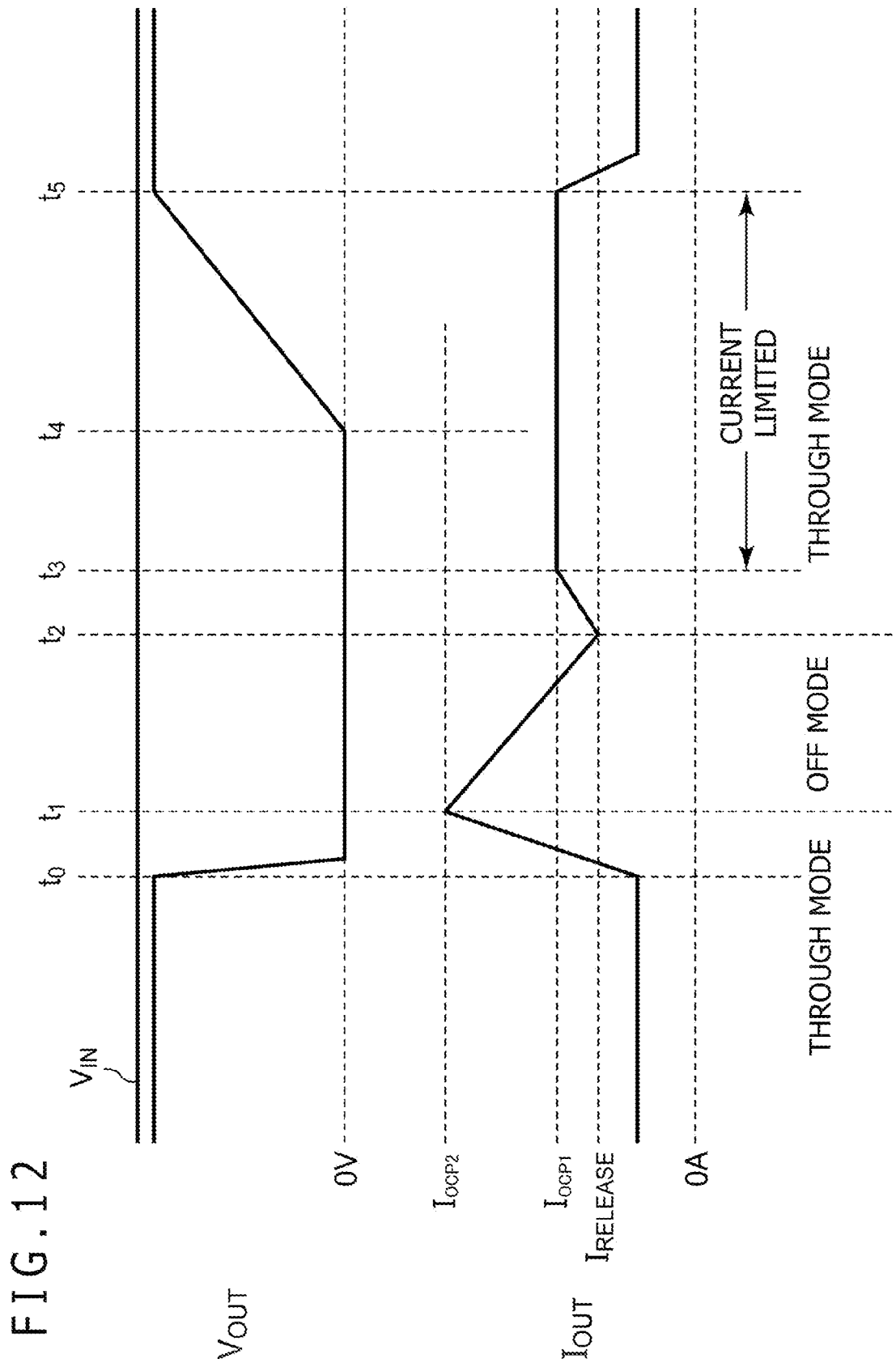
FIG. 12 is a diagram describing an operation of the control circuit in FIG. 11.

FIG. 12 is a diagram describing an operation of the control circuit 200G in FIG. 11. The control circuit 200G operates in the second mode (through mode) before time t0.

Once the output line 104 is shorted to ground at time t0, the output voltage $V_{OUT}$ drops to near 0 V, and the output current $I_{OUT}$ sharply increases. Once the current $I_{OUT}$ exceeds the second overcurrent threshold $I_{OCP2}$ at time $t_1$, the load switch drive circuit 270G transitions to the third mode (off mode). As a result, the input voltage $V_{IN}(=V_C)$ is applied to the gate of the first PMOS transistor MP1.

In this case, the first PMOS transistor MP1 is not immediately turned off, and instead, the first PMOS transistor MP1 operates as a source follower circuit. As a result, the source voltage of the first PMOS transistor MP1, that is, the voltage $V_{MID}$ of a connection node of the load switch SW1 and the high side transistor MH is clamped to $$V_{MID}=V_C+V_{GS},$$

and this can prevent generation of an overvoltage.

In this case, the voltage $V_{SW}$ of the switching pin SW that is a connection node of the high side transistor MH and the low side transistor ML is $$V_{SW}=V_{MID}+V_F=V_C+V_{GS}+V_F \approx V_{IN}+V_{GS}+V_F,$$

and this suppresses an overvoltage of the switching pin SW.

In this case, a voltage $V_L$ across the inductor is $$V_L=V_{IN}-V_{SW}=V_{IN}-(V_C+V_{GS}+V_F).$$

When $V_C \approx V_{IN}$ is set as described above, $$V_L \approx (V_{GS}+V_F)$$

is established. This can reduce the coil current IL as well as the output current $I_{OUT}$ with time at a slope of $-(V_{GS}+V_F)/L$.

Once the output current $I_{OUT}$ drops to the release threshold $I_{RELEASE}$ at time $t_2$, the load switch drive circuit 270G returns to the second mode (through mode). However, the short-to-ground state still persists, and the output current $I_{OUT}$ increases. Once the output current $I_{OUT}$ exceeds the first overcurrent threshold $I_{OCP1}$ at time $t_3$, the current limitation by the load switch drive circuit 270G functions, and the output current $I_{OUT}$ is clamped to $I_{OCP1}$.

Subsequently, once the short-to-ground state is eliminated at time $t_4$, the output voltage $V_{OUT}$ rises to near the input voltage $V_{IN}$. The current limitation is also released after time $t_5$.

This completes the description of the operation of the control circuit 200G. According to the control circuit 200G, the load switch drive circuit 270G can operate in the third mode when there is a sudden overcurrent, and this can suppress the overvoltage and ringing of the voltage $V_{MID}$.

Modifications

The embodiments are illustrative, and those skilled in the art will understand that there can be various modifications for the combinations of the constituent elements and the processes of the embodiments. The modifications will be described below.

In relation to the first to third embodiments, the low side transistor ML and the high side transistor MH may be provided as external discrete elements.

In relation to the first to third embodiments, the first PMOS transistor MP1 may be provided as an external discrete element. In this case, part or all of the load switch drive circuit 270 may be provided as a discrete element outside the IC of the control circuit 200E.

The load switch drive circuit 270 may support a fourth mode. In the fourth mode, the load switch drive circuit 270 performs feedback control of the gate voltage of the first PMOS transistor MP1 to bring the output voltage $V_{OUT}$ close to the target level $V_{OUT(REF)}$. The fourth mode will also be referred to as an LDO (low drop output) mode.

The load switch drive circuit 270 may operate in the fourth mode at the activation of the DC-DC converter 100. In this case, the reference voltage $V_{REF}$ may be softly raised with time to softly raise the output voltage $V_{OUT}$ (soft start). At the completion of the soft start, the load switch drive circuit 270 may transition to the second mode (through mode) when the input voltage $V_{IN}$ is higher than the target level $V_{OUT(REF)}$ of the output voltage $V_{OUT}$.

(Usage)

Next, usage of the DC-DC converters 100E to 100G (hereinafter, simply referred to as 100) will be described.

Figure 13:
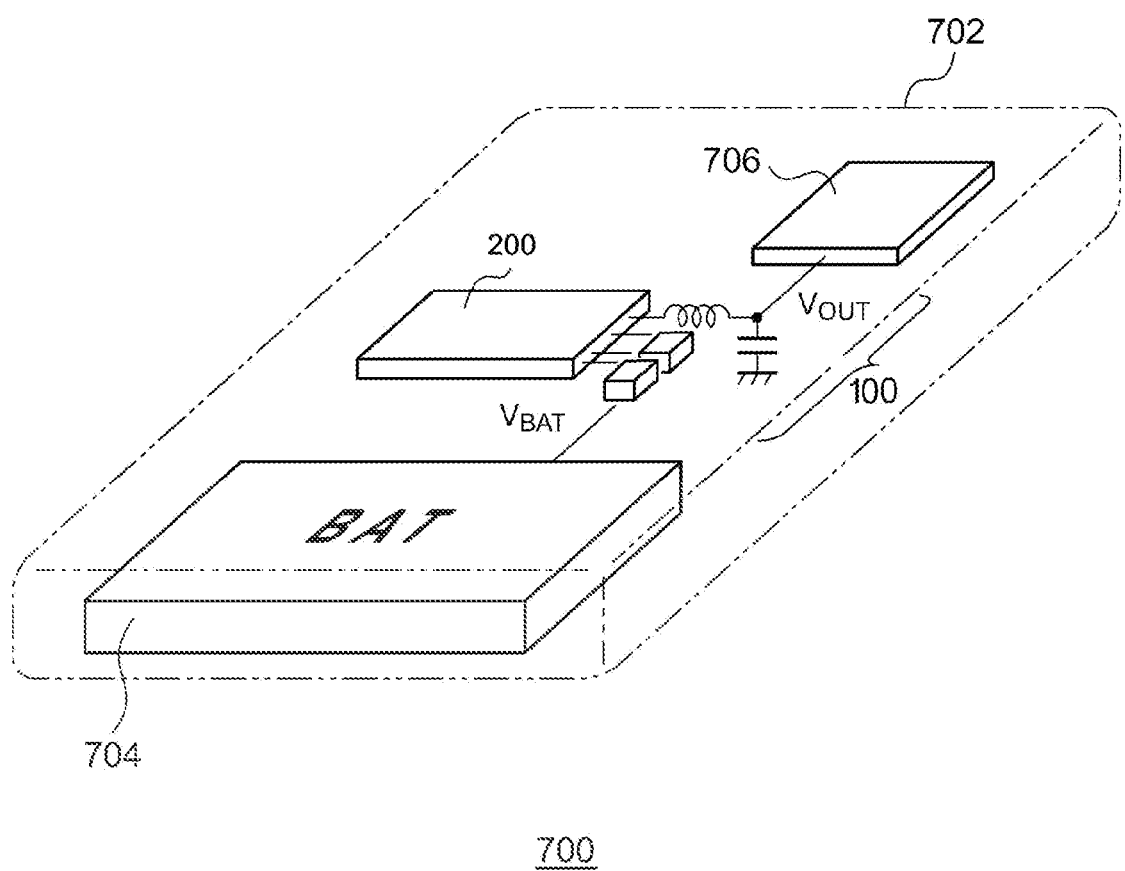
FIG. 13 depicts an example of an electronic device including the DC-DC converter according to the embodiments.

FIG. 13 depicts an example of an electronic device 700 including the DC-DC converter 100 according to the embodiments. The electronic device 700 is, for example, a battery-powered device, such as a mobile phone terminal, a digital camera, a digital video camera, a tablet terminal, and a portable audio player. The electronic device 700 includes a housing 702, a battery 704, a microprocessor 706, and the DC-DC converter 100. The DC-DC converter 100 receives a battery voltage $V_{BAT}$ ($=V_{IN}$) from the battery 704 through the input terminal and supplies the output voltage $V_{OUT}$ to the load connected to the output terminal.

The type of electronic device 700 is not limited to the battery-powered device. The electronic device 700 may be an in-vehicle device, may be office automation (OA) equipment such as a facsimile, or may be industrial equipment.

The embodiments are illustrative, and those skilled in the art will understand that there can be various modifications for the combinations of the constituent elements and the processes of the embodiments and that the modifications can be included in the present disclosure and the scope of the present disclosure.

What is claimed is:

1. A control circuit of a boost DC-DC converter, wherein DC represents direct current, the boost DC-DC converter includes a high side transistor and a low side transistor, and a load switch is connected between the high side transistor and an output line of the boost DC-DC converter, the control circuit comprising:
    a pulse modulator that generates a pulse signal with a pulse modulated to bring an output voltage of the output line close to a target level;
    a logic circuit that generates a high side control signal and a low side control signal based on the pulse signal;
    a load switch drive circuit that drives a first PMOS transistor provided as the load switch, wherein PMOS represents p-channel metal-oxide semiconductor; and
    a current detection circuit that generates a current detection signal indicating a first current flowing through the first PMOS transistor, wherein the load switch drive circuit is switchable between a first mode for fully turning on the first PMOS transistor and a second mode for changing a gate voltage of the first PMOS transistor according to the current detection signal such that a current supply capacity of the first PMOS transistor becomes larger than an amount of the first current indicated by the current detection signal.

2. The control circuit according to claim 1, wherein the load switch drive circuit in the second mode biases a first gate of the first PMOS transistor such that the first PMOS transistor has the current supply capacity of equal to or greater than K times (K>1) the amount of the first current indicated by the current detection signal.

3. The control circuit according to claim 1, wherein $I_{OUT(MAX)}=K \times I_{OUT(SNS)}+I_{OFS}$ is satisfied, and $I_{OUT(SNS)}$ represents the amount of the first current indicated by the current detection signal, $I_{OUT(MAX)}$ represents the current supply capacity of the first PMOS transistor, and $I_{OFS}$ and K (>1) are constants.

4. The control circuit according to claim 1, wherein the load switch drive circuit includes:
a second PMOS transistor with a first size of 1/M times a specific size of the first PMOS transistor, a second gate of the second PMOS transistor connected to a first gate of the first PMOS transistor in the second mode, a second source of the second PMOS transistor connected to a first source of the first PMOS transistor, the second gate and a first drain of the second PMOS transistor connected through a wire, wherein M is a non-zero value; and
a constant current circuit that supplies the second PMOS transistor with a second current of equal to or greater than K/M times the amount of the first current indicated by the current detection signal, where K is a parameter greater than 1.

5. The control circuit according to claim 4, wherein the constant current circuit includes:
a first transistor, a first end of the first transistor connected to the first drain of the second PMOS transistor;
a first resistance connected between a second end of the first transistor and a ground line; and
a first operational amplifier, wherein
an output of the first operational amplifier is connected to a control terminal of the first transistor,
the first operational amplifier receives the current detection signal through a first input node of the first operational amplifier, and
a second input node of the first operational amplifier is connected to the second end of the first transistor.

6. The control circuit according to claim 5, wherein the first operational amplifier has a non-zero input offset voltage.

7. The control circuit according to claim 5, wherein a voltage obtained by offsetting the current detection signal is supplied to the first input node of the first operational amplifier.

8. The control circuit according to claim 1, wherein the load switch drive circuit sets the current supply capacity of the first PMOS transistor to a first overcurrent threshold in a region in which the amount of the first current indicated by the current detection signal exceeds the first overcurrent threshold.

9. The control circuit according to claim 4, wherein the constant current circuit adjusts the current supplied to the second PMOS transistor to prevent the amount of the first current indicated by the current detection signal from exceeding a first overcurrent threshold.

10. The control circuit according to claim 5, wherein the constant current circuit further includes a current limit circuit that controls a voltage of the control terminal of the first transistor to prevent the amount of the first current indicated by the current detection signal from exceeding a first overcurrent threshold.

11. The control circuit according to claim 10, wherein the current limit circuit includes:
a second transistor, wherein a first end of the second transistor is connected to the control terminal of the first transistor, and a second end of the second transistor connected to the ground line; and
a third operational amplifier, wherein
an output of the third operational amplifier is connected to a control terminal of the second transistor, and
the third operational amplifier receives a voltage defining the first overcurrent threshold through a first input node of the third operational amplifier, and
the third operational amplifier receives the current detection signal through a second input node of the third operational amplifier.

12. The control circuit according to claim 8, wherein
the load switch drive circuit is switchable to a third mode for applying a voltage corresponding to an input voltage of the boost DC-DC converter to a first gate of the first PMOS transistor, and
the load switch drive circuit enters the third mode when the amount of the first current indicated by the current detection signal exceeds a second overcurrent threshold larger than the first overcurrent threshold.

13. The control circuit according to claim 12, wherein the load switch drive circuit returns to an original mode when the amount of the first current indicated by the current detection signal falls below a release threshold smaller than the first overcurrent threshold.

14. The control circuit according to claim 4, wherein the current detection circuit includes:
a third PMOS transistor with a second size of 1/N times the specific size of the first PMOS transistor, a third gate of the third PMOS transistor connected to the second gate of the second PMOS transistor, a third source of the third PMOS transistor connected to the second source of the second PMOS transistor, wherein N is a non-zero value;
a third transistor, a first end of the third transistor connected to a second drain of the third PMOS transistor;
a second resistance connected between a second end of the third transistor and a ground line; and
a third operational amplifier, wherein
an output of the third operational amplifier is connected to a control terminal of the third transistor,
a first input node of the third operational amplifier is connected to a third drain of the first PMOS transistor, and
a second input node of the third operational amplifier connected to the second drain of the third PMOS transistor, and
the current detection signal corresponds to a voltage drop of the second resistance.

15. The control circuit according to claim 1, wherein the load switch drive circuit is switchable to a third mode for applying a voltage corresponding to an input voltage of the boost DC-DC converter to a first gate of the first PMOS transistor.

16. The control circuit according to claim 1, wherein the control circuit is integrated into one semiconductor substrate.

17. A power supply circuit comprising:
a main circuit of a boost DC-DC converter, wherein DC represents direct current; and
the control circuit according to claim 1.

18. An electronic device comprising:
the control circuit according to claim 1.

19. A control circuit of a boost DC-DC converter, wherein DC represents direct current, the boost DC-DC converter including a high side transistor and a low side transistor, and a load switch connected between the high side transistor and an output line of the boost DC-DC converter, the control circuit comprising:

a pulse modulator that generates a pulse signal with a pulse modulated to bring an output voltage of the output line close to a target level;

a logic circuit that generates a high side control signal and a low side control signal based on the pulse signal;

a load switch drive circuit that drives a first PMOS transistor provided as the load switch, wherein PMOS represents p-channel metal-oxide semiconductor; and a current detection circuit that generates a current detection signal indicating a first current flowing through the first PMOS transistor, wherein the load switch drive circuit includes:

a second PMOS transistor with a size of 1/M times a size of the first PMOS transistor, a second gate of the second PMOS transistor connectable to a first gate of the first PMOS transistor, a source of the second PMOS transistor connected to a source of the first PMOS transistor, the second gate and a drain of the second PMOS transistor connected through a wire; and a constant current circuit that supplies the second PMOS transistor with a second current of equal to or greater than K/M times an amount of the first current indicated by the current detection signal.

* * * * *